United States Patent [19]
Schmid

[11] Patent Number: 5,026,098
[45] Date of Patent: Jun. 25, 1991

[54] COUPLING

[75] Inventor: Thomas Schmid, Augsburg, Fed. Rep. of Germany

[73] Assignee: MTU Motoren- und Turbinen-Union Munchen GmbH, Fed. Rep. of Germany

[21] Appl. No.: 379,963

[22] Filed: Jul. 14, 1989

[30] Foreign Application Priority Data

Jul. 19, 1988 [DE] Fed. Rep. of Germany ....... 3824453

[51] Int. Cl.$^5$ .............................................. F16L 55/00
[52] U.S. Cl. ................... 285/174; 285/187; 285/286; 228/173.2
[58] Field of Search ................. 285/174, 21, 187, 286; 228/173.2; 29/446, DIG. 48

[56] References Cited

U.S. PATENT DOCUMENTS 3,188,116  6/1965  Christensen ...................... 285/187 X
3,232,643  2/1966  Mikeska ........................... 285/187 X
3,411,812  11/1966 Prince et al. ......................... 285/187
3,746,374  7/1973  Sedgwick et al. .................... 285/187

FOREIGN PATENT DOCUMENTS 811060   9/1951  Fed. Rep. of Germany ...... 285/187
1555228  1/1964  France ................................. 285/187
758616   10/1956 United Kingdom ................ 285/286

Primary Examiner—Dave W. Arola
Attorney, Agent, or Firm—Evenson, Wands, Edwards, Lenahan & McKeown

[57] ABSTRACT

This invention relates to a coupling involving two components butting one on the other under preload via at least one mating surface, where a coupling sleeve overlapping the two components in the area of the mating surface lodges against the first component via an abutment and the preload is transmitted to the second component via a welded joint. In this manner the components are joined together in a heat-resistant, inseparable, small-bulk and low-weight connection that can be gastight if the mating surface and the components are designed accordingly and that is feasible also when the components are made of materials that do not permit brazing or welding them together or cold or hot forming.

37 Claims, 2 Drawing Sheets

COUPLING

BACKGROUND AND SUMMARY OF THE INVENTION

This invention relates to a coupling involving two components abutting one on the other under preload.

With separable joints, such couplings typically are unions for crimped joints, bayonet signs for bayonet joints, or clamps for flanged connections. These couplings are embarassed by a disadvantage in that they require means to be provided on the components for clamping the components to each other, such as threads, bayonet latches or conical flanges. These means disadvantageously economize neither space nor weight.

With inseparable interlocking joints, use is made of, e.g., die or pressing clamps. These couplings require less installation space then separable couplings, but they disadvantageously assume that the components to be joined together permit of cold or hot forming.

Inseparable brazed or welded joints require the least bulk and weight, but they disadvantageously can be used only with weldable materials.

In a broad aspect of the present invention a coupling of the generic description given above is provided to achieve an inseparable, heat-resistant connection between two components of materials which cannot be welded or brazed together and cannot be cold or hot formed, where the coupling can be adapted to suit differing component sections and is designed to economize space and weight.

It is a particular object of the present invention to provide a coupling in which a coupling sleeve overlapping two components in the area of the mating surface lodges against a first component via an abutment and in which the preload is transmitted to the second component through a welded joint.

In this arrangement of the present invention the weld between the coupling sleeve and one of the components to be connected, or between two coupling sleeves, will shrink when the weld is made and cooled, so that a preload is achieved between the components in the joint to clamp them together in a heat-resistant and inseparable connection.

To enhance the preload between the two components, the components and the coupling sleeve can be assembled together under additional preload in a clamping device, such as a vise, and then welded together under this preload.

The arrangement of the present invention thus avoids disadvantages involved in the state of the art and affords an advantage over separable joints in that functional surfaces, such as mating, faying or bearing surfaces of the abutment can be adapted to suit the cross-sections of the components to be joined together and so save space and weight.

In a first embodiment of the present invention the weld joint is arranged directly between the coupling sleeve and the second component, which assumes that the coupling sleeve and the second component are made of materials that can be welded together.

In a second embodiment of the present invention the weld joint is arranged between the coupling sleeve and a second coupling sleeve, where the preload is transmitted to the second component through an abutment on the second coupling sleeve. This arrangement advantageously permits components to be joined together when their materials cannot be welded to the material of the coupling sleeve.

In an especially advantageous aspect of the present invention the coupling sleeve consists of a material that has a higher coefficient of thermal expansion than the material of one or both of the components, preferably so when the coupling sleeve is made of metal and one or both of the components of a ceramic material. Since the coupling sleeve will axially shrink more than one or both of the components, an additional preload is achieved that superimposes on the shrinkage of the weld when the components cool down.

This effect is advantageously enhanced when the length of the coupling sleeve is made 3 to 30 times, preferably 5 to 15 times its wall thickness.

Separable couplings require circular or partially circular functional surfaces, so that on components of noncircular cross-section, bulky flanges must be provided as cross-sectional transitions. In a further advantageous aspect of the present invention, therefore, the form of the functional surfaces of the coupling sleeve is adapted to suit the cross-sections of the two components.

The coupling of the present invention is especially well-suited for tubular components of round, oval or angular section.

If the invention is utilized in gas-wetted systems it will be advantageous to give the mating surface an axially aligned radial spigot plus a gas-tight, conical or spheroidal sealing face.

Other objects, advantages and novel features of the present invention will become apparent from the following detailed description of the invention when considered in conjunction with the accompanying drawings.

DETAILED DESCRIPTION OF THE DRAWING

Figure 1:
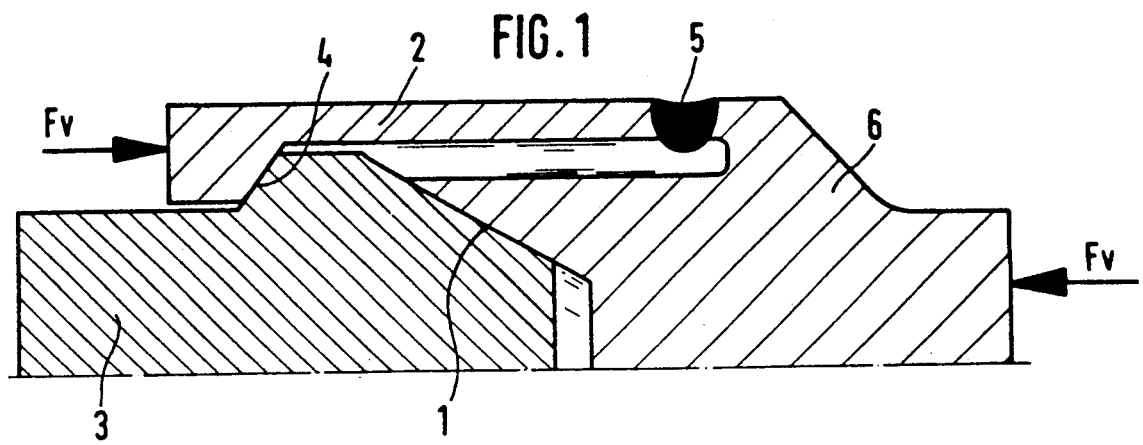
FIG. 1 is a longitudinal section illustrating a coupling involving two solid components of ceramic and metal material, of square section, with a metallic coupling sleeve, constructed in accordance with a preferred embodiment of the invention.

FIG. 1 illustrates a first component 3 of square section axially joined under preload to a second component 6 of identical section via a conical mating surface 1 of identical section. This preload is applied through a welded joint 5 arranged between the metallic component 6 and a metallic coupling sleeve 2 of square section via an abutment 4 acting on the first component 3.

The materials of the second component 6 and the coupling sleeve 2 have a higher coefficient of thermal expansion than the first component 3, so that when the coupling sleeve 2 shrinks axially, additional preload is superimposed on the preload caused by the welded joint. The radially-directed shrinkage of the coupling sleeve is additionally deflected via the conical bearing surface of the abutment 4 to form a further, superimposed preload. Through this coupling the ceramic component 3, which is sensitive to tensile loads, advantageously comes under compression only. To increase the preload the coupling elements are mechanically preloaded at the time of welding in the direction of arrows Fv by means of a vise.

Figure 2:
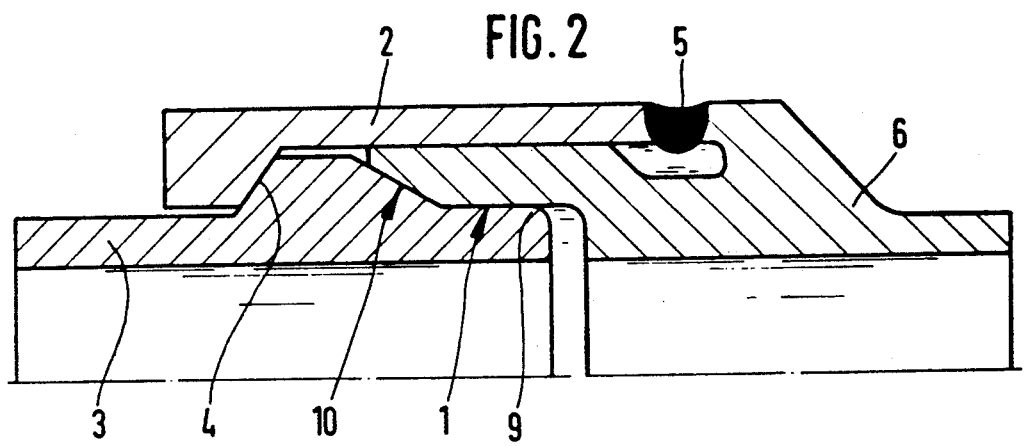
FIG. 2 is a longitudinal section illustrating a coupling involving two tubular metallic components having a conical sealing face and a metallic coupling sleeve, constructed in accordance with another preferred embodiment of the invention.

FIG. 2 is a longitudinal section and illustrates a coupling involving two metallic, tubular components 3 and 6 that cannot be welded together. The mating surface 1 exhibits a gas-tight sealing face 10 and an axially aligned radial spigot 9. The weld joint 5 causing the preload is here arranged directly between the second tubular component 6 and the coupling sleeve 2. The length of the coupling sleeve here is 10 times its wall thickness. The sealing face 10 here takes a conical shape.

Figure 3:
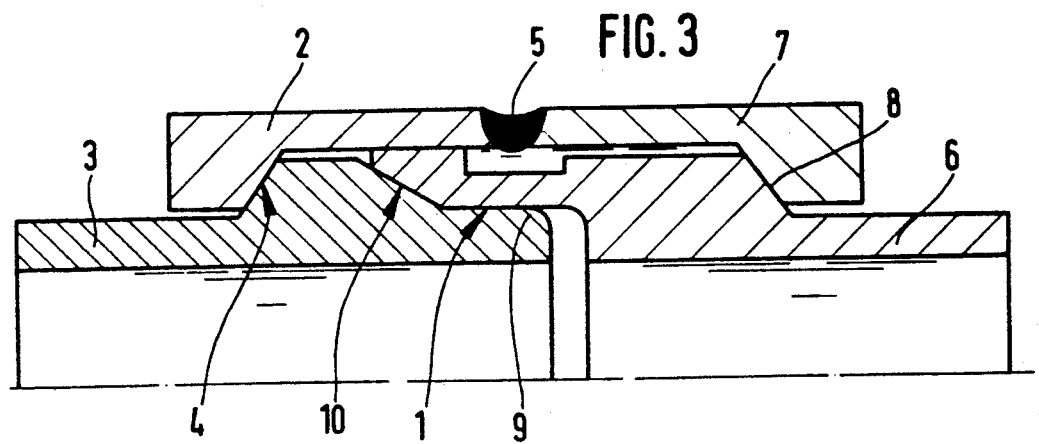
FIG. 3 is a longitudinal section illustrating a coupling involving two tubular ceramic components, with two welded-together metallic coupling sleeves. Constructed in accordance with yet another preferred embodiment of the invention.

FIG. 3 is a longitudinal section illustrating a coupling involving two tubular ceramic components with two welded together coupling sleeves of metal which each have an abutment 4 and 8 to press the ceramic components 3 and 3 together under preload, where a mating surface 1 is formed into an axially aligned radial spigot 9 and a conical sealing face 10.

Figure 3A:
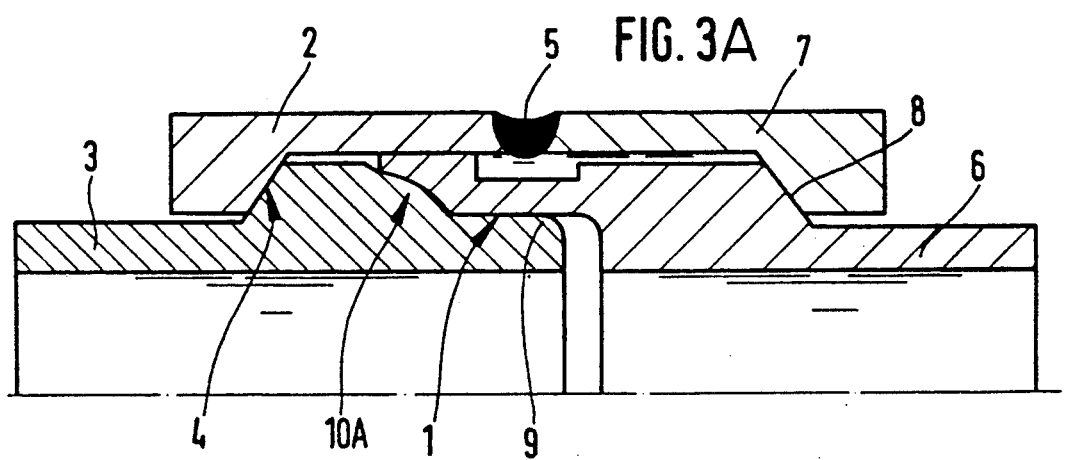
FIG. 3A schematically depicts an alternative embodiment with a spheroidal sealing face.

FIG. 3A is a longitudinal sectional view illustrating a coupling similar to FIG. 3, but with a spheroidal sealing face 10A in place of the conical sealing face 10 of FIG. 3.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A coupling arrangement for connecting first and second relatively non-weldable components in abutting contact with one another at least one mating surface, said coupling arrangement comprising:
   a coupling sleeve surrounding the first and second components and overlapping the at least one mating surface, said coupling sleeve being formed from first and second sleeve parts, and
   a welded joint connecting the first and second sleeve parts,
   wherein the welded joint and the first and second sleeve parts having dimensional and thermal expansion coefficient characteristics such that when the welded joint in applied and cooled, a pre-stress is generated which forces the first and second sleeve parts closer together so that the sleeve clamping holds the first and second components with respect to one another in a heat resistant and undetachable manner without utilizing any detachable connection of said two components and said sleeve.

2. A coupling arrangement according to claim 1, wherein the first component is formed of weldable material and the second component is formed of material which is not weldable to the first component, and wherein the first sleeve part is integrally formed with the first component.

3. A coupling arrangement according to claim 2, wherein the coupling sleeve is made of a material having a higher coefficient of thermal expansion than that of the second component.

4. A coupling arrangement according to claim 3, wherein the coupling sleeve and first component is made of metal and the second component is constructed of a ceramic material.

5. A coupling arrangement according to claim 4, wherein the length of the coupling sleeve is between 3 and 30 times its wall thickness.

6. A coupling arrangement according to claim 1, wherein the first and second sleeve pars are separate from the first and second components.

7. A coupling arrangement according to claim 6, wherein the coupling sleeve is made of a material having a higher coefficient of thermal expansion than that of at least one of the first and second components.

8. A coupling arrangement according to claim 7, wherein the coupling sleeve is made of metal and at least one of the first and second components is constructed of ceramic material.

9. A coupling arrangement according to claim 8, wherein the length of the coupling sleeve is between 3 and 30 times its wall thickness.

10. A coupling arrangement according to claim 1, wherein the coupling sleeve is made of material having a higher coefficient of thermal expansion than the material of at least one of the first and second components, whereby preheating of the coupling arrangement before welding results in a subsequent tightening of the clamping effect of the coupling sleeve on the first and second components.

11. A coupling arrangement according to claim 1, wherein at least one of the relatively non-weldable components is constructed of a ceramic material.

12. A coupling arrangement according to claim 1, wherein the length of the coupling sleeve is between 3 and 30 times its wall thickness.

13. A coupling arrangement according to claim 12, wherein the length of the coupling sleeve is between 5 and 30 times its wall thickness.

14. A coupling arrangement according to claim 1, wherein the at least one mating surface exhibits a conical shape.

15. A coupling arrangement according to claim 1, wherein the cross-sectional shape of the coupling sleeve is adapted to suit the contour of the cross-sectional shape of the first and second components.

16. A coupling arrangement according to claim 15, wherein the first and the second components are tubular in shape.

17. A coupling arrangement according to claim 1, wherein the first and the second components are tubular in shape.

18. A coupling arrangement according to claim 1, wherein the mating surface exhibits an axially aligned radial spigot and one of a gas-tight conical stating face and a gas-tight spheroidal sealing face.

19. A coupling arrangement according to claim 1, wherein said components have adjacent and faces and said adjacent end faces of the two components are spaced from one another, said at least one mating surface being located spaced from said end faces.

20. A method of making a coupling arrangement for connecting first and second relatively non-weldable components in abutting contact with one another at least one mating surface, said method comprising:
   disposing a coupling sleeve in surrounding relationship to the first and second components with overlapping of the at least one mating surface by the coupling sleeve, said coupling sleeve being formed from first and second sleeve parts, and forming a welded joint connecting the first and second sleeve parts wherein the welded joint and the first and second sleeve parts having dimensional and thermal expansion coefficient characteristics such that when the welded joint is applied and cooled, a pre-stress is generated which forces the first and second sleeve parts closer together so that the sleeve clampingly holds the first and second components with respect to one another in a heat resistant and undetachable manner without utilizing any detachable connection of said two components and said sleeve.

21. A method according to claim 20, wherein the first component is formed of weldable material and the second component is formed of material which is not weldable to the first component, and wherein the first sleeve part is integrally formed with the first component.

22. A method according to claim 21, wherein the coupling sleeve is made of a material of having a higher coefficient of thermal expansion than that of the second component.

23. A method according to claim 20, wherein the first and second sleeve parts are separate from the first and second components.

24. A method according to claim 23, wherein the coupling sleeve is made of a material having a higher coefficient of thermal expansion than that of at least one of the first and second components.

25. A method according to claim 24, wherein the coupling sleeve and first component are made of metal and the second component is constructed of a ceramic material.

26. A method according to claim 24, wherein the coupling sleeve is made of metal and at least one of the first and second components is constructed of ceramic material.

27. A method according to claim 26, wherein the length of the coupling sleeve is between 3 and 30 times its wall thickness.

28. A method according to claim 25, wherein the length of the coupling sleeve is between 3 and 30 times its wall thickness.

29. A method according to claim 20, wherein the coupling sleeve is made of material having a higher coefficient of thermal expansion than the material of at least one of the first and second components, whereby preheating of the coupling arrangement before welding results in a subsequent tightening of the clamping effect of the coupling sleeve on the first and second components.

30. A method according to claim 20, wherein the coupling sleeve is made of metal and at least one of the first and second components is constructed of a ceramic material.

31. A method according to claim 20, wherein the length of the coupling sleeve is between 3 and 30 times its wall thickness.

32. A method according to claim 31, wherein the length of the coupling sleeve is between 3 and 30 times its will thickness.

33. A method according to claim 20, wherein at least one mating surface exhibits a conical shape.

34. A method according to claim 20, wherein the cross-sectional shape of the coupling sleeve is adapted to suit the contour of the cross-sectional shape of the first and second components.

35. A method according to claim 34, wherein the mating surface exhibits an axially aligned radial spigot and one of a gas-tight conical sealing face and a gas-tight spheroidal sealing face.

36. A method according to claim 20, wherein the first and the second components are tubular in shape.

37. A method according to claim 20, wherein said components have adjacent end faces and said adjacent end faces of the two components are spaced from one another, said at least one mating surface being located spaced from said end faces.

* * * * *